United States Patent
Schultalbers et al.

(10) Patent No.: US 6,578,546 B2
(45) Date of Patent: Jun. 17, 2003

(54) METHOD AND DEVICE FOR CONTROLLING AN INTERNAL COMBUSTION ENGINE

(75) Inventors: Winfried Schultalbers, Meinersen (DE); Hanno Jelden, Lehre (DE); Rudolf Krebs, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/193,861

(22) Filed: Jul. 12, 2002

(65) Prior Publication Data

US 2002/0179041 A1 Dec. 5, 2002

Related U.S. Application Data

(63) Continuation of application No. PCT/EP00/13007, filed on Dec. 20, 2000.

(30) Foreign Application Priority Data

Jan. 12, 2000 (DE) ......................................... 100 00 918

(51) Int. Cl.$^7$ ............................... F02B 3/04; F02D 41/40
(52) U.S. Cl. ...................... 123/300; 123/399; 123/480
(58) Field of Search ............................... 123/295, 299, 123/300, 305, 350, 352, 361, 399, 478, 480, 488, 436

(56) References Cited

U.S. PATENT DOCUMENTS

| | | | | |
|---|---|---|---|---|
| 4,349,000 A | * | 9/1982 | Staerzl ........................ 123/491 |
| 4,432,430 A | | 2/1984 | Lind et al. .................... 180/197 |
| 5,159,913 A | * | 11/1992 | Furuya ......................... 123/493 |
| 5,429,091 A | * | 7/1995 | Huber et al. ................. 123/399 |
| 5,445,128 A | | 8/1995 | Letang et al. ................ 123/436 |
| 5,483,927 A | | 1/1996 | Letang et al. ............ 123/41.12 |
| 5,522,365 A | * | 6/1996 | Milunas et al. .............. 123/480 |
| 5,615,654 A | | 4/1997 | Weisman, II et al. ....... 123/350 |
| 5,647,317 A | | 7/1997 | Weisman, II et al. ....... 123/299 |
| 5,727,528 A | | 3/1998 | Hori et al. ................... 123/486 |
| 5,847,644 A | | 12/1998 | Weisman, II et al. ....... 340/439 |
| 5,918,582 A | * | 7/1999 | Itoyama et al. ......... 123/480 X |
| 5,960,765 A | * | 10/1999 | Ilda et al. .................... 123/295 |
| 5,975,047 A | * | 11/1999 | Kamura et al. .............. 123/305 |
| 6,102,002 A | | 8/2000 | Gimmler et al. ............. 123/399 |
| 6,334,425 B1 | * | 1/2002 | Nagatani et al. ............ 123/295 |

FOREIGN PATENT DOCUMENTS

| | | | |
|---|---|---|---|
| DE | 197 11 477 A1 | 9/1997 | |
| DE | 198 51 990 A1 | 6/2000 | |
| EP | 0 891 895 A2 | 1/1999 | |
| EP | 0 921 296 A2 | 6/1999 | |
| EP | 0 937 884 A2 | 8/1999 | |
| JP | 59-194046 | * 11/1984 | ................. 123/478 |
| JP | 63-239338 | * 10/1988 | ................. 123/472 |
| JP | 11-324771 | * 11/1999 | |
| WO | WO 00/26522 | 5/2000 | |

* cited by examiner

Primary Examiner—Tony M. Argenbright
(74) Attorney, Agent, or Firm—Laurence A. Greenberg; Werner H. Stemer; Manfred Beck

(57) ABSTRACT

A method for controlling an internal combustion engine determines a desired torque based on an actuating position of an accelerator pedal. A normal fuel quantity based on a given normal efficiency is determined. A relative efficiency is determined based on at least current operating conditions of the internal combustion engine. The normal fuel quantity is corrected based on the relative efficiency in order to determine a fuel quantity which is to be metered to the internal combustion engine. A device for controlling an internal combustion engine is also provided.

10 Claims, 1 Drawing Sheet

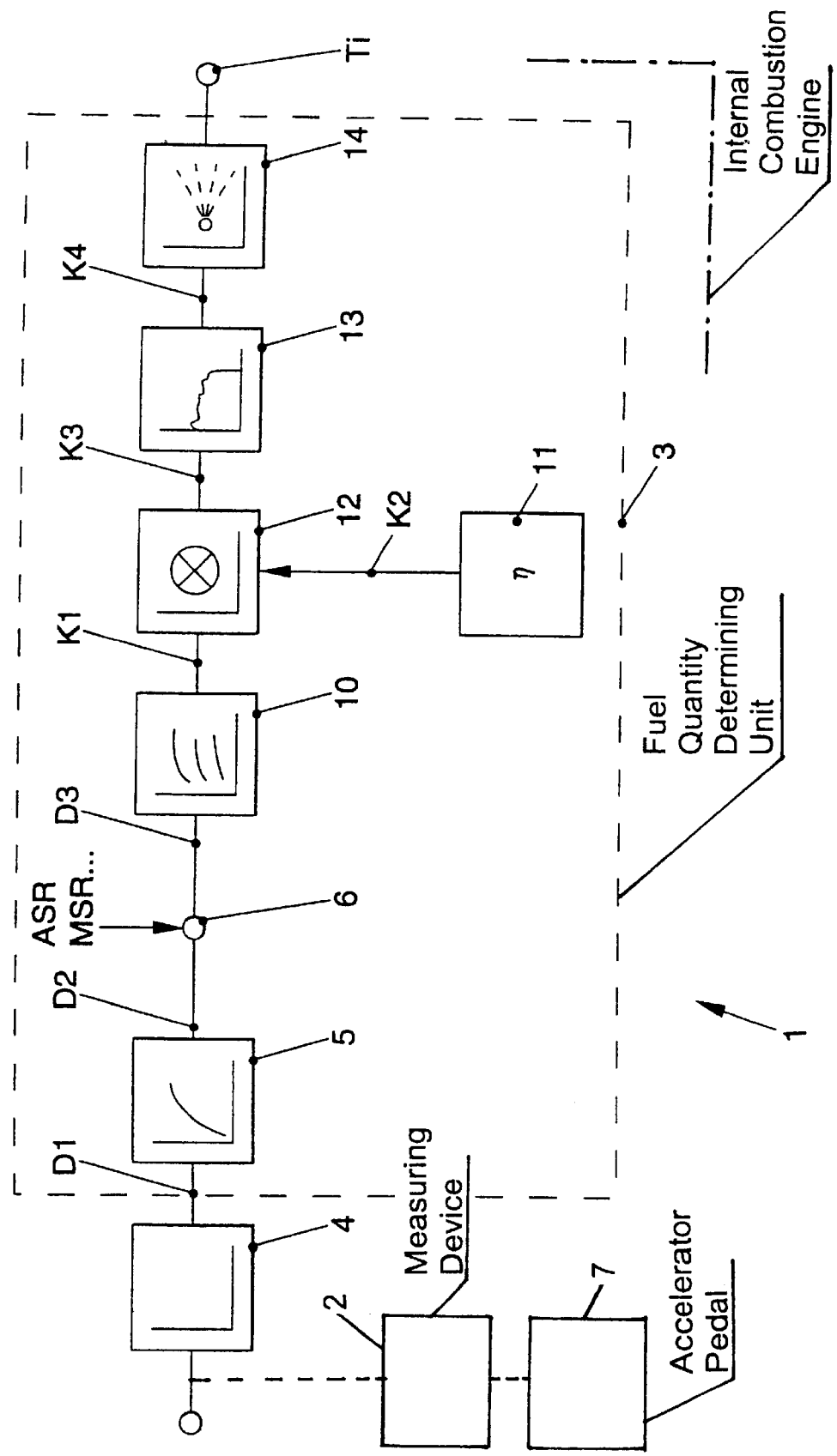

METHOD AND DEVICE FOR CONTROLLING AN INTERNAL COMBUSTION ENGINE

CROSS-REFERENCE TO RELATED APPLICATIONS

This application is a continuation of copending International Application No. PCT/EP00/13007, filed Dec. 20, 2000, which designated the United States.

BACKGROUND OF THE INVENTION

FIELD OF THE INVENTION

The invention relates to a method and a device for controlling an internal combustion engine, in particular a spark ignition engine with a direct fuel injection.

Ever greater requirements are being made of modern internal combustion engines, for example, in terms of reducing the fuel consumption and the emitted pollutants and in terms of a fault-free operation. The requirements are to be fulfilled under all load states of the internal combustion engine and even when changing between different load states. The various load states result essentially from the current driving situation taking into account a driver's requirement for a reduction or an increase in the torque made available by the internal combustion engine, wherein the requirement is expressed by the driver of a vehicle having the internal combustion engine.

In controllers of the type under consideration here, the determination of a desired torque or torque setpoint value corresponding to the driver's requirement is carried out on the basis of the position of at least one operator control element which can be actuated by the driver and which is generally the accelerator pedal. In vehicles with a spark ignition engine, the torque setpoint value is converted into a setpoint position for the throttle valve, which is carried out in vehicles with an electronic engine power controller (EGas, electronic gas pedal) electronically through the use of an electromotive throttle valve adjustment. Also, if appropriate, in addition to the ignition angle or injection angle which is to be set, the fuel quantity which is necessary to generate the desired torque and which is to be metered to the internal combustion engine is determined, for example, by calculation. By metering fuel to the internal combustion engine the fuel quantity which is determined and, if appropriate, by correspondingly setting the ignition angle or injection angle and/or further control variables, a torque which corresponds to the desired torque is generated. The fuel is metered into a combustion chamber of the internal combustion engine, preferably through the use of fuel injection, in particular through the use of a direct injection.

In conventional controllers, the intake air which is drawn in by the internal combustion engine, more specifically an air quantity signal or air mass flow rate signal which represents this intake air serves as a reference variable for determining the fuel quantity to be metered. An air quantity meter provides information on the intake air quantity to the controller. Further measuring pickups or sensors determine all the other data which are necessary for the allocation of fuel and signal the data, in particular data referring to the engine speed and the load state of the internal combustion engine, to the controller. The optimum parameters, in particular for the fuel quantity to be injected or the injection time, if appropriate the ignition angle to be set and/or the air charge to be metered, are determined from these input variables. In modern controllers, the assignment of the control variables to the input variables is carried out through the use of corresponding characteristic diagrams (input-output maps) of the controller.

In addition to the control of the quantity of the fuel/air mixture, a precise control of the mixture composition, that is to say of the fuel enrichment in the fuel/air mixture is necessary in order to adapt to different operating states of the internal combustion engine. The fuel/air mixture ratio is characterized, as is known, by the air ratio $\lambda$ which expresses the ratio between the supplied air quantity and the theoretical air requirement for complete combustion. Here, $\lambda=1$ corresponds to an ideal value (homogeneous mixture), values of $\lambda<1$ correspond to a deficit of air or a rich mixture and are set, for example, when the engine is started and in the full load range, and values of $\lambda>1$ correspond to an excess of air or a lean mixture such as is desired, for example, in the partial load range in order to achieve a particularly economical operation.

In modern internal combustion engines with direct fuel injection, the fuel quantity to be metered is determined on the basis of different characteristic diagrams such that the fuel quantity is adapted to the load state, each characteristic diagram corresponding to a specific mode of operation. A stratified operating mode with a very lean mixture which is combustible only in the vicinity of the spark plug, a homogeneous, uniformly lean operating mode with excess air (economical driving) and a homogenous operating mode ($\lambda=1$) are selected, for example, as operating modes. Switching over between these operating modes is carried out as a function of the driver's requirements and the current driving situation. The switching over can lead to jumps in the torque that is output by the internal combustion engine. These torque jumps can have disruptive and annoying effects such as jolting or shuffling when driving.

SUMMARY OF THE INVENTION

It is accordingly an object of the invention to provide a method and a device for controlling an internal combustion engine which overcome the above-mentioned disadvantages of the heretofore-known methods and devices of this general type and which, in particular, provide a jolt-free or shuffle-free operation of internal combustion engines with direct fuel injection when changing between operating modes.

With the foregoing and other objects in view there is provided, in accordance with the invention, a method for controlling an internal combustion engine, the method includes the steps of:

determining a desired torque based on a position of at least one operating control element actuatable by a driver;

determining a fuel quantity which is to be metered to the internal combustion engine and which is necessary to generate the desired torque, by performing the steps of:
   determining a normal fuel quantity based on a given normal efficiency;
   determining a relative efficiency based on current operating conditions of the internal combustion engine; and
   correcting the normal fuel quantity by using the relative efficiency in order to determine the fuel quantity which is to be metered to the internal combustion engine; and generating a torque of the internal combustion engine corresponding to the desired torque by metering the fuel quantity to the internal combustion engine.

According to the invention, several steps are carried out when determining the fuel quantity to be metered, in particular when determining the fuel quantity to be injected. Here, the intake air quantity is not used, as hitherto, as a reference variable, but rather the efficiency of fuel metering operations is used as the control variable for determining the correct fuel metering quantity. Firstly, in reaction to the torque demand derived from the driver's requirement, an assumed or predefined normal efficiency is used as the basis for determining a normal fuel quantity or for determining a variable representing this normal fuel quantity corresponding to this efficiency. The term "efficiency" as used in the instant application represents the efficiency with which a fuel quantity which is metered, for example by an injection, is converted into a torque which is generated by the internal combustion engine on the basis of this fuel quantity. It goes without saying that this efficiency depends not only on the metered fuel quantity but also in particular on the time of the fuel quantity metering operation during a power stroke and on the current composition of the mixture of fuel and air. The efficiency, which may be present as a dimensionless value, changes depending on the operating point. The normal efficiency forms a reference variable which corresponds to an assumed normal operating state, for example the described homogeneous operation with $\lambda=1$. For other influencing variables which define the operating state, it is also possible to assume normal values or optimum values. The assignment between the input variable (required torque) and output variable (normal fuel quantity or a corresponding signal) of this determination can be carried out in a basic characteristic diagram (input-output map) for the reference operating mode.

In methods according to the invention, there is also a determination of what is referred to as a relative efficiency $\eta$ on the basis of the current operating conditions of the internal combustion engine. This determination can take place simultaneously or essentially simultaneously with the sensing of the torque demand derived from the driver's requirement. In particular the actual values, sensed by respective sensors, of the injection angle or the ignition angle, of an exhaust gas feedback and/or of the fresh air mass, which is taken in and which is set by throttling and/or charging, can be taken into account when determining the current or relative efficiency $\eta$. The relative efficiency will often differ from the normal efficiency but can also be identical to it if the current operating state corresponds to that operating state which serves as a basis for calculating the normal efficiency.

The value for the normal fuel quantity is then corrected on the basis of the relative efficiency $\eta$ which has been determined, in order to determine the fuel quantity which is actually to be metered. The fuel quantity which is actually to be metered will generally differ from the normal fuel quantity which is present as a computational variable. However, it may also be identical to the normal fuel quantity if the relative efficiency corresponds to the underlying, assumed normal efficiency.

According to the invention, deviations from the efficiency in the underlying normal operation are therefore calculated in a "relative efficiency model" and taken into account with a correction function. Given a suitable selection of the reference operating mode for the calculation of the normal efficiency, the deviations between the normal efficiency and the relative efficiency may be relatively small, and may be, for example, less than a maximum of 20 to 25% of the normal efficiency. As a result, errors which are possibly present or which possibly occur in the calculation of the relative efficiency $\eta$ in the efficiency model have only a relatively small influence on the change of the calculated fuel metering between the normal fuel quantity which serves as a first approximation and the "ideal" fuel quantity which is better adapted to the current operating state and which is actually to be metered.

The modeling of the relative efficiency $\eta$ according to the invention and the fact that the relative efficiency $\eta$ is taken into account when metering of the fuel has in particular the result that a torque continuity is maintained and torque jumps are prevented when there is a switching over between different operating modes. The invention therefore allows a continuous or infinitely variable, essentially jolt-free production or provision of the desired torque even when a switching over between operating modes (fuel/air ratio, injection angle or ignition angle) of the internal combustion engine occurs due to reasons related to the combustion method.

The setpoint values for injection angles or ignition angles, exhaust gas feedback and/or the intake air mass which is to be set by throttling and/or charging, and if appropriate further variables, can be set simultaneously, or essentially simultaneously, for the determination of the fuel quantity which is actually to be metered, as a function of the desired operating mode of the internal combustion engine in accordance with predefined characteristic diagrams (input-output maps). The intake air mass flow rate can remain relatively static here.

According to another mode of the invention, a main fuel metering operation and at least one secondary fuel metering operation is carried out during a power stroke of the internal combustion engine. The relative efficiency is determined separately for each of the main fuel metering operation and the at least one secondary fuel metering operation. The fuel quantity, which is to be metered, is determined by determining a main fuel quantity and by taking into account a secondary fuel quantity to be metered in accordance with the at least one secondary metering operation. In particular, the fuel quantity, which is to be metered, is determined by determining a main fuel quantity and by subtracting, from the main fuel quantity, a secondary fuel quantity to be metered in accordance with the at least one secondary metering operation.

In modern controllers, during a power stroke of the internal combustion engine, at least one secondary fuel metering operation is carried out in addition to a main fuel metering operation due to reasons related to the combustion method or due to reasons related to a subsequent treatment of the exhaust gas. For example, a post-injection can be used in order to increase the exhaust gas temperature for the purpose of improving the subsequent exhaust gas treatment. One embodiment according to the invention provides for such cases that the determination of a value for the relative efficiency is carried out separately for each of the fuel metering operations (main metering operation, secondary metering operation), and that the determined secondary fuel quantity which corresponds to the at least one secondary fuel metering operation and which is to be metered is taken into account when determining the fuel quantity, which is actually to be metered, from the main fuel quantity determined. This measure takes into account the fact that the bases for calculating the efficiency of a fuel metering operation are different, for example, for different ignition angles. The efficiency-weighted injection quantities of a pre-injection operation and/or a post-injection operation can be subtracted from the determined main injection quantity in order to avoid changing the overall torque to be generated and in order to keep the torque at the value of the desired torque.

During a control operation, measures for adapting the driving behavior to the driving dynamics can be provided in order, for example, to carry out a jolt-damping, a shuttle-damping and/or a load shift-damping. In one embodiment according to the invention, the desired torque, which is derived from the operator control element setting, is corrected before the determination of the fuel quantity to be metered, on the basis of parameters for adapting the driving behavior, as a result of which the input variable for the described efficiency-optimized calculation of the metering of the fuel quantity can be changed.

In other words, according to a mode of the invention, the desired torque is corrected based on parameters for affecting a driving behavior prior to performing an efficiency-based determination of the fuel quantity which is to be metered.

External torque interventions, such as a can be brought about, for example, by a traction controller (TC) or more specifically an anti-slip regulation (ASR), an engine torque controller (ETC) or more specifically an engine drag torque regulation (MSR) or other traction systems, can be suitably taken into account before the efficiency-based determination of the fuel quantity to be metered. Thus, for example when a traction controller intervenes, the input variable corresponding to a torque for the efficiency-optimized metering of fuel can be corrected so that, deviating from the expressed driver's requirement, the torque is generated in such a way that a slip is taken into account.

In other words, according to another mode of the invention, the desired torque is corrected based on at least one external torque intervention parameter prior to performing an efficiency-based determination of the fuel quantity which is to be metered. In particular, the desired torque is corrected based on a drive slip control and an engine drag torque control.

According to another embodiment of the invention, a maximum fuel quantity is determined based on the air mass available for combustion, wherein the air mass or more specifically the air mass flow rate can be sensed by an appropriate sensor system, and wherein the maximum fuel quantity which is to be metered is the maximum fuel quantity for an essentially smokeless combustion. The fuel quantity which is actually to be metered is limited to this maximum fuel quantity. In other words, based on an air quantity available for combustion, a maximum permissible fuel quantity to be metered for a substantially smoke-free combustion is determined and the fuel quantity, which is to be metered, is limited to the maximum permissible fuel quantity. This measure, which is suitable for limiting smoke, can take into account dynamic effects which result, for example, from the fact that in a driving situation there may briefly be an insufficient amount of air available for the combustion necessary to generate the desired torque. As a result, the emission of pollutants from the internal combustion engine can also be minimized in extreme situations. When the operation of limiting smoke is activated, the fuel quantity which is actually injected may be lower than the fuel quantity which is determined on the basis of the efficiency model and which corresponds to the driver's requirement.

The invention makes it possible, in particular, to avoid the described disadvantages when operating spark ignition engines with a direct injection. However, the invention can also advantageously be used with other types of fuel metering, in particular with an intake manifold injection. The method according to the invention in which the efficiency of injections serves as a limiting presetting is also possible for diesel internal combustion engines.

As stated, according to another mode of the invention, the fuel quantity is metered to the internal combustion engine by directly injecting the fuel quantity into a combustion chamber of the internal combustion engine. In particular, the internal combustion engine may be a spark ignition engine.

With the objects of the invention in view there is also provided, a device for controlling an internal combustion engine, including:

an electronic control unit including a fuel quantity determining unit for determining a fuel quantity which is to be metered to the internal combustion engine and which is necessary to generate a desired torque;

at least one driver-actuatable operator control element connected to the electronic control unit, the at least one driver-actuatable operator control element having an actuating position;

the electronic control unit determining the desired torque at least based on the actuating position of the at least one driver-actuatable operator control element;

the fuel quantity determining unit including a first determining unit, a second determining unit, and a correcting unit;

the first determining unit determining a normal fuel quantity based on a given normal efficiency, the first determining unit outputting at least a first signal representing the normal fuel quantity;

the second determining unit determining a relative efficiency based on at least an operating signal representing current operating conditions of the internal combustion engine, the second determining unit outputting a second signal representing the relative efficiency; and the correcting unit correcting the first signal based on the second signal, the correcting unit generating a fuel quantity signal representing the fuel quantity which is to be metered to the internal combustion engine.

With the objects of the invention in view there is further provided, in combination with a spark ignition engine having a direct fuel injection, a device for controlling the spark ignition engine including:

an electronic control unit including a fuel quantity determining unit for determining a fuel quantity which is to be metered to the spark ignition engine and which is necessary to generate a desired torque;

at least one driver-actuatable operator control element connected to the electronic control unit, the at least one driver-actuatable operator control element having an actuating position;

the electronic control unit determining the desired torque at least based on the actuating position of the at least one driver-actuatable operator control element;

the fuel quantity determining unit including a first determining unit, a second determining unit, and a correcting unit;

the first determining unit determining a normal fuel quantity based on a given normal efficiency, the first determining unit outputting at least a first signal representing the normal fuel quantity;

the second determining unit determining a relative efficiency based on at least an operating signal representing current operating conditions of the spark ignition engine, the second determining unit outputting a second signal representing the relative efficiency; and the correcting unit correcting the first signal based on the second signal, the correcting unit generating a fuel quantity signal representing the fuel quantity which is to be metered to the spark ignition engine.

Other features which are considered as characteristic for the invention are set forth in the appended claims.

Although the invention is illustrated and described herein as embodied in a method and a device for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The single FIGURE is a flow diagram in the form of a block diagram for illustrating a preferred embodiment of a method and a device for controlling an internal combustion engine according to the invention.

DESCRIPTION OF THE PREFERRED EMBODIMENTS

Referring now to the single FIGURE in detail, there is shown a schematic view of a detail of an electronic control unit 1 for controlling an internal combustion engine which is embodied as a spark ignition engine with a direct fuel injection. The internal combustion engine is only schematically indicated as a dash-dotted line. The electronic control unit 1 has an input circuit (not shown), at least one microcomputer for processing digital signals and an output circuit (not shown), these elements being connected to one another via a suitable communications link for exchanging data with one another. Input lines (not shown), which lead to measuring devices, are connected to various measuring devices at the input circuit in order to supply the electronic control unit 1 with all the parameters required for an optimum combustion process, in the form of suitable signals for evaluation. In particular a measuring device for sensing the engine speed, a measuring device for sensing the quantity of fresh air fed to the internal combustion engine and a measuring device for sensing the position of the throttle valve of the internal combustion engine are connected to the input circuit. Signals for further operating variables of the internal combustion engine and/or of the vehicle, which are evaluated in order to control the internal combustion engine, are fed to the input circuit via further measuring devices (not shown). Such operating variables are, for example, intake air temperature, ambient pressure, intake manifold pressure, exhaust gas composition or the like. A connected measuring device 2 for sensing the position of the accelerator pedal 7 serves to feed to the electronic control unit 1 a signal which represents the driver's requirement, that is to say the requirement of the driver for a reduction or an increase of the instantaneous torque of the internal combustion engine.

The electronic control unit 1 outputs, via the output circuit, output signals to control the power of the internal combustion engine. In particular the quantity for fuel metering, which is represented by the injection time, the ignition time or ignition angle and the charging of the internal combustion engine by setting a throttle valve of the internal combustion engine are controlled through the use of the output signals.

In a preferred embodiment, a fuel quantity determining unit 3 (explained in more detail with reference to the single FIGURE) which is integrated into the electronic control unit 1 is used to determine the metering of the fuel quantity. The method of operation of the fuel quantity determining unit 3 is illustrated in the form of a flowchart for reasons of clarity. The control method according to the invention is implemented in the preferred exemplary embodiment as a program of a microcomputer of the control unit. The elements illustrated in the single FIGURE therefore represent programs, program parts or program steps of such an implementation and the FIGURE also represents the corresponding paths of the signal line.

During operation of the control system there is provision that a setpoint value for a torque of the internal combustion engine is predefined at least on the basis of the position of the accelerator pedal 7, sensed by the measuring device 2 (for example a pedal value sensor), and the current engine speed. In order to derive a signal corresponding to the desired torque or torque setpoint value, the embodiment shown is provided with a first characteristic diagram (input-output map) 4 which is also referred to as a driving behavior characteristic diagram and which determines the setpoint torque or desired torque which corresponds to these values from the signal for the accelerator pedal position and the signal for the engine speed and outputs a corresponding signal D1.

If devices for influencing the dynamic driving behavior, for example a jolt damping or shuffle damping, a transmission controller and/or other measures in the drive train are present in the motor vehicle, their influences on the desired torque can be determined in a second characteristic diagram 5 from corresponding measured values or control variables and modified at the output of the second characteristic diagram 5 in order to generate a signal D2 which is, if appropriate, modified with respect to the signal D1.

If the vehicle including the internal combustion engine has units which change the torque requested by the internal combustion engine so that it differs from the driver's requirement, a desired torque signal D2 can be modified on the basis of these interventions at a suitable point 6 of the signal processing to form a desired torque signal D3 which takes into account the external torque interventions. These units which change the torque that is requested are referred to as external torque interventions such as a traction controller (TC) or more specifically an anti-slip regulation (ASR), an engine torque controller (ETC) or more specifically an engine drag torque regulation (MSR) or the like.

The signal D3 which corresponds to the desired torque which is, if appropriate, modified serves as an input signal of a first unit 10 of the fuel quantity determining unit 3. The first unit 10 determines, from the input signal D3 representing a torque requirement, on the basis of a normal efficiency of a fuel metering, the normal efficiency being assumed and predefined by a corresponding programming, a value for a normal fuel quantity which, assuming the normal efficiency, would generate a torque corresponding to the torque requirement which has been input. A first signal K1 which represents this normal fuel quantity is output. The first unit 10 preferably includes a characteristic diagram which, for the calculation of the normal efficiency, can, for example, start from a homogeneous operation of the internal combustion engine (air ratio $\lambda=1$) and a suitable normal ignition angle. Operating modes where $\lambda<1$ or $\lambda>1$ can also be used as a basis for calculation.

Because, as a rule, there are frequent changes between different operating modes during the operation of an internal combustion engine, a fuel injection on the basis of the first signal K1 would only result in a fraction of cases in the torque actually desired by the driver whereas in cases in which the actual operating state differs from the normal operating state used as a basis, incorrect fuel quantities, and thus incorrect torques, would be the result.

In order to avoid or reduce such deviations from the driver's requirement, the fuel quantity determining unit contains a second unit 11 which calculates, on the basis of at least one operating signal which represents the current operating conditions of the internal combustion engine, what is referred to as a "relative efficiency" η as a reference variable for the determination of the fuel quantity, and outputs a second signal K2 which represents the relative efficiency η. The relative efficiency is determined here in a suitable efficiency model from measurement variables and control variables which are present in the control unit. In particular the current actual values for the injection angle and/or the ignition angle, the exhaust gas feedback rate, the air ratio λ and values for the charge pressure and/or intake manifold pressure which correspond to the fresh air mass flow rate which is taken in and is set by throttling and/or charging, and are also determined by the current throttle valve position, are used as the basis for calculation. The current relative efficiency is expediently determined continuously, for example at intervals of several milliseconds in each case.

For the desired torque continuity when changing between operating modes, it is essential that the fuel quantity (represented by the first signal K1) which is to be injected and which is determined on the basis of an assumed normal efficiency is checked with respect to the torque which can actually be achieved through the use of this fuel quantity under the current operating conditions, and is corrected if appropriate. For this purpose, a correction unit 12 for correcting the first signal K1 on the basis of the second signal K2 and for generating a true fuel quantity signal K3 which represents the fuel quantity which is actually to be metered is provided. A fuel quantity signal K3 which corresponds to the fuel quantity which is actually to be injected is determined in a characteristic diagram (see correction unit 12) as a function of the normal fuel quantity (signal K1) which is calculated for a normal operation, and the relative efficiency η (signal K2). In operating modes which differ from the normal operating mode (normally λ=1) used as the basis, this leads to a correction factor which is different from the factor 1 and which is taken into account in the calculation of the fuel quantity to be actually injected from the (hypothetical) normal fuel quantity. In this way, the efficiency model ensures that the torque which is generated before and after switching over the operating mode is essentially the same, as a result of which torque jumps can be prevented.

It has become apparent that this correction factor, which is dependent on the assumed normal efficiency and the efficiency model, generally lies between approximately 0.8 and approximately 1.2. The modeling of the relative efficiency and the fact that it is taken into account in the calculation of the injection quantity therefore generally leads to deviations from the normal fuel quantity of not more than 20 to 25%. This means that the method according to the invention is relatively immune to possible errors in the basic assumptions which are taken into account in the efficiency model. The method according to the invention is also relatively immune to possible errors in the corresponding calculation algorithm as well as relatively immune to possible errors when measuring the underlying basic variables (for example ignition angle, charge pressure or the like).

In conventional controllers a sensed air mass signal (or air quantity signal) is used as a reference variable for calculating the fuel quantity, the ignition time etc. for controlling the internal combustion engine. In contrast thereto, in methods according to the invention, it is the case that, as a reference variable, the efficiency of an injection under given operating conditions is used as a predefined limiting value and control variable and is employed to determine the fuel quantity which is actually to be metered.

In order to improve the emission of pollutants further, in the embodiment explained with reference to the single FIGURE, a unit 13 for limiting smoke is also provided with a corresponding characteristic diagram. The unit determines, on the basis of the air quantity which is sensed through the use of a suitable measuring device and which is actually available for combustion, a maximum fuel quantity to be metered which is the maximum one permissible for an essentially smoke-free combustion. This quantity is compared with the efficiency-optimized quantity which is represented by the signal K3 and determined on the basis of efficiency calculations. In cases in which the efficiency-optimized fuel quantity (signal K3) to be metered is greater than the maximum fuel quantity, a signal K4 which corresponds to the maximum fuel quantity is read out or is output, otherwise the signal K3 remains valid. As a result, dynamic effects, such as may occur, for example, due to a brief air deficiency, can be taken into account.

The output signal of the fuel quantity determining unit which represents a specific fuel quantity to be injected is ultimately used as an input signal of a further characteristic diagram 14 which, as a function of the desired fuel quantity, calculates the injection time Ti which corresponds to the desired fuel quantity.

In the method which is explained in by way of example and the corresponding device for controlling an internal combustion engine, there is thus provision that a normal fuel quantity to be injected which is required to generate the desired torque is determined, starting from a desired torque due to a driver's requirement, on the basis of an assumed normal efficiency of a fuel injection. The fuel quantity is subsequently corrected in order to calculate a fuel quantity, which is actually to be metered to the internal combustion engine, by taking into account the current efficiency, referred to as a relative efficiency, of the internal combustion engine. The fact that the relative efficiency calculated in an efficiency model is taken into account has the effect of largely preventing torque jumps when changing between operating modes of the internal combustion engine.

We claim:

1. A method for controlling an internal combustion engine, the method which comprises:

determining a desired torque based on a position of at least one operating control element actuatable by a driver;

determining a fuel quantity which is to be metered to the internal combustion engine and which is necessary to generate the desired torque, by performing the steps of:

determining a normal fuel quantity based on a given normal efficiency;

determining a relative efficiency based on current operating conditions of the internal combustion engine; and correcting the normal fuel quantity by using the relative efficiency in order to determine the fuel quantity which is to be metered to the internal combustion engine;

generating a torque of the internal combustion engine corresponding to the desired torque by metering the fuel quantity to the internal combustion engine;

carrying out, during a power stroke of the internal combustion engine, a main fuel metering operation and at least one secondary fuel metering operation;

determining the relative efficiency separately for each of the main fuel metering operation and the at least one secondary fuel metering operation; and determining the fuel quantity, which is to be metered, by determining a main fuel quantity and by taking into account a secondary fuel quantity to be metered in accordance with the at least one secondary fuel metering operation.

2. The method according to claim 1, which comprises determining the fuel quantity, which is to be metered, by subtracting the at least one secondary fuel quantity from the main fuel quantity.

3. The method according to claim 1, which comprises correcting the desired torque based on parameters for affecting a driving behavior prior to performing an efficiency-based determination of the fuel quantity which is to be metered.

4. The method according to claim 1, which comprises:

providing at least one external torque intervention parameter; and correcting the desired torque based on the at least one external torque intervention parameter prior to performing an efficiency-based determination of the fuel quantity which is to be metered.

5. The method according to claim 4, which comprises providing the at least one external torque intervention parameter with at least one controller selected from the group consisting of a drive slip controller and an engine drag torque controller.

6. The method according to claim 1, which comprises:

determining, based on an air quantity available for combustion, a maximum permissible fuel quantity to be metered for a substantially smoke-free combustion; and limiting the fuel quantity, which is to be metered, to the maximum permissible fuel quantity.

7. The method according to claim 1, which comprises metering the fuel quantity to the internal combustion engine by directly injecting the fuel quantity into a combustion chamber of the internal combustion engine.

8. The method according to claim 1, which comprises providing a spark ignition engine as the internal combustion engine.

9. A device for controlling an internal combustion engine, comprising:

an electronic control unit including a fuel quantity determining unit for determining a fuel quantity which is to be metered to the internal combustion engine and which is necessary to generate a desired torque, said electronic control unit determining the fuel quantity, which is to be metered, by determining a main fuel quantity for a main fuel metering operation during a power stroke of the internal combustion engine and by taking into account a secondary fuel quantity for at least one secondary fuel metering operation during the power stroke of the internal combustion engine;

at least one driver-actuatable operator control element connected to said electronic control unit, said at least one driver-actuatable operator control element having an actuating position;

said electronic control unit determining the desired torque at least based on the actuating position of the at least one driver-actuatable operator control element;

said fuel quantity determining unit including a first determining unit, a second determining unit, and a correcting unit;

said first determining unit determining a normal fuel quantity based on a given normal efficiency, said first determining unit outputting at least a first signal representing the normal fuel quantity;

said second determining unit determining a relative efficiency separately for each of the main fuel metering operation and the at least one secondary fuel metering operation based on at least an operating signal representing current operating conditions of the internal combustion engine, said second determining unit outputting a second signal representing the relative efficiency; and said correcting unit correcting the first signal based on the second signal, said correcting unit generating a fuel quantity signal representing the fuel quantity which is to be metered to the internal combustion engine.

10. In combination with a spark ignition engine having a direct fuel injection, a device for controlling the spark ignition engine comprising:

an electronic control unit including a fuel quantity determining unit for determining a fuel quantity which is to be metered to the spark ignition engine and which is necessary to generate a desired torque;

at least one driver-actuatable operator control element connected to said electronic control unit, said at least one driver-actuatable operator control element having an actuating position;

said electronic control unit determining the desired torque at least based on the actuating position of the at least one driver-actuatable operator control element;

said fuel quantity determining unit including a first determining unit, a second determining unit, and a correcting unit;

said first determining unit determining a normal fuel quantity based on a given normal efficiency, said first determining unit outputting at least a first signal representing the normal fuel quantity;

said second determining unit determining a relative efficiency based on at least an operating signal representing current operating conditions of the spark ignition engine, said second determining unit outputting a second signal representing the relative efficiency; and said correcting unit correcting the first signal based on the second signal, said correcting unit generating a fuel quantity signal representing the fuel quantity which is to be metered to the spark ignition engine.

* * * * *

UNITED STATES PATENT AND TRADEMARK OFFICE
CERTIFICATE OF CORRECTION

PATENT NO.     : 6,578,546 B2
DATED          : June 17, 2003
INVENTOR(S)    : Winfried Schutalbers et al.

It is certified that error appears in the above-identified patent and that said Letters Patent is hereby corrected as shown below:

Title page,
Item [73], Assignee, the name should read as follows:
-- Volkswagen Aktiengesellschaft,
  Wolfsburg (DE) --.

Signed and Sealed this

Ninth Day of September, 2003

JAMES E. ROGAN
*Director of the United States Patent and Trademark Office*